United States Patent
Saff et al.

(10) Patent No.: US 8,955,290 B2
(45) Date of Patent: Feb. 17, 2015

(54) SANDWICH STRUCTURE HAVING ARRESTMENT FEATURE

(71) Applicant: The Boeing Company, Chicago, IL (US)

(72) Inventors: Charles R. Saff, St. Peters, MO (US); John H. Fogarty, St. Louis, MO (US); Haozhong Gu, Chesterfield, MO (US); Terry D. Richardson, Dardenne Prairie, MO (US); Kevin M. Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/716,593

(22) Filed: Dec. 17, 2012

(65) Prior Publication Data

US 2013/0129970 A1 May 23, 2013

Related U.S. Application Data

(62) Division of application No. 12/631,029, filed on Dec. 4, 2009.

(51) Int. Cl.
| | | |
|---|---|---|
| E04C 2/54 | (2006.01) | |
| E04C 2/34 | (2006.01) | |
| E04C 2/36 | (2006.01) | |
| E04B 1/74 | (2006.01) | |
| E04C 3/00 | (2006.01) | |
| B32B 3/18 | (2006.01) | |
| B32B 3/06 | (2006.01) | |
| B32B 3/12 | (2006.01) | |

(52) U.S. Cl.
CPC ... *B32B 3/18* (2013.01); *B32B 3/06* (2013.01); *B32B 3/12* (2013.01)

USPC ............ 52/783.1; 52/783.14; 52/783.18; 52/783.19; 52/784.14; 52/784.15; 52/790.1; 52/793.1; 52/794.1; 52/793.11; 52/404.3; 52/404.5; 52/470; 52/466; 52/468; 52/404.2

(58) Field of Classification Search
USPC .............. 52/783.1, 783.14, 783.18, 783.19, 52/784.14, 784.15, 790.1, 793.1, 793.11, 52/794.1, 404.2, 404.3, 404.5, 470, 466, 52/468, 465
See application file for complete search history.

(56) References Cited

U.S. PATENT DOCUMENTS

| | | | | |
|---|---|---|---|---|
| 3,106,500 | A | * | 10/1963 | Turner .......................... 156/91 |
| 3,331,174 | A | * | 7/1967 | Wesch et al. ............... 52/309.11 |

(Continued)

FOREIGN PATENT DOCUMENTS

| | | |
|---|---|---|
| WO | 0136189 A1 | 5/2001 |
| WO | 2011068592 A1 | 6/2011 |

OTHER PUBLICATIONS

International Search Report, dated Nov. 26, 2010, regarding Application No. PCT/US2010/052343 (WO2011068592), 2 pages.

(Continued)

*Primary Examiner* — Phi A
*Assistant Examiner* — Omar Hijaz
(74) *Attorney, Agent, or Firm* — Yee & Associates, P.C.

(57) ABSTRACT

A composite sandwich structure comprises a core sandwiched between composite laminate facesheets. The core includes a plurality of core sections spliced together at joints that incorporate integral features for arresting the propagation of irregularities in the facesheets.

10 Claims, 6 Drawing Sheets

(56) References Cited

U.S. PATENT DOCUMENTS

| | | | | |
|---|---|---|---|---|
| 3,552,329 A | * | 1/1971 | Parris | 108/51.11 |
| 3,826,056 A | * | 7/1974 | Smith et al. | 52/582.2 |
| 4,099,355 A | * | 7/1978 | Strunk | 52/404.3 |
| 4,416,349 A | * | 11/1983 | Jacobs | 181/208 |
| 4,557,961 A | * | 12/1985 | Gorges | 428/117 |
| 4,671,470 A | | 6/1987 | Jonas | |
| 4,712,352 A | * | 12/1987 | Low | 52/794.1 |
| 4,744,186 A | * | 5/1988 | Smith et al. | 52/404.3 |
| 5,154,963 A | | 10/1992 | Terry | |
| 5,245,809 A | * | 9/1993 | Harrington | 52/309.11 |
| 6,065,259 A | * | 5/2000 | Clear | 52/284 |
| 7,197,852 B2 | * | 4/2007 | Grillos | 52/144 |
| 7,669,372 B2 | * | 3/2010 | Schaffer | 52/309.7 |
| 2006/0037282 A1 | * | 2/2006 | Layfield | 52/794.1 |
| 2006/0165480 A1 | * | 7/2006 | Kennedy | 403/272 |
| 2007/0134466 A1 | * | 6/2007 | Rajaram et al. | 428/116 |
| 2007/0256379 A1 | * | 11/2007 | Edwards | 52/309.9 |
| 2011/0135887 A1 | | 6/2011 | Saff et al. | |
| 2012/0193016 A1 | | 8/2012 | Saff et al. | |

OTHER PUBLICATIONS

Russell et al., "Damage Tolerance and Fail-Safety of Composite Sandwich Panels," SAE 1994 Transactions, Journal of Aerospace, vol. 103, Oct. 1994, pp. 2175-2182.

Tomblin et al., "Review of Damage Tolerance for Composite Sandwich Airframe Structures," Office of Aviation Research Final Report No. DOT/FAA/AR-99/49, Aug. 1999, 71 pages.

Office Action, dated Dec. 15, 2011, regarding U.S. Appl. No. 12/631,029, 11 pages.

Final Office Action, dated Apr. 20, 2012, regarding U.S. Appl. No. 12/631,029, 9 pages.

Office Action, dated Jul. 5, 2012, regarding U.S. Appl. No. 13/431,706, 10 pages.

Office Action, dated Jun. 20, 2014, regarding U.S. Appl. No. 12/631,029, 27 pages.

\* cited by examiner

SANDWICH STRUCTURE HAVING ARRESTMENT FEATURE

This application is a divisional of application Ser. No. 12/631,029, filed Dec. 4, 2009, status pending.

Application Ser. No. 13/431,706 filed Mar. 27, 2012 is also a divisional of application Ser. No. 12/631,029, filed Dec. 4, 2009, status pending.

TECHNICAL FIELD

This disclosure generally relates to composite structures, and deals more particularly with a composite sandwich structure having a segmented core and an integral arrestment feature.

BACKGROUND

One type of composite structure used in a variety of applications comprises a core sandwiched between a pair of composite facesheets, sometimes referred to as a sandwich structure. Where the core includes multiple core details, such as multiple core segments joined together, the structure may be referred to as a "core blanket". The core in these structures may be formed of any of various materials including, but not limited to honeycombs, foams and balsa, to name only a few. The facesheets may be formed from multiple laminated plies of a fiber reinforced resin.

Inconsistencies may sometimes occur within localized areas of the facesheets of these sandwich structures. For example, a facesheet may contain a void, a dent or a porosity that may occur at the time the facesheet is manufactured or later during the service life of the sandwich structure. For instance, a facesheet impacted by an object may cause a localized disbond or crack occurring in one or more plies of the facesheet. Unless arrested, a disbond or crack may spread or propagate to areas outside of the local impact area.

One solution to the problem involves the inclusion of substructures within the sandwich to limit the propagation of inconsistencies, however substructures may be relatively expensive to manufacture and assemble, and may add additional weight to the sandwich structure. In addition, known substructure solutions are specifically designed to either limit propagation of disbands or cracks, but may not limit both. It may be possible to combine multiple substructure designs in order to arrest the propagation of both disbonds and cracks, however the use of multiple substructures may lead to an overall composite structure design that exceeds target weight specifications. Another solution to the problem is to limit the operating strain applied to the sandwich structure, and perform periodic visual checks on the integrity of the structure, however this approach may not be practical in some applications where the operating strains placed on the sandwich structure cannot be limited, and/or predicted.

Accordingly, there is a need for a sandwich structure having a lightweight but robust core capable of reducing or arresting the propagation of irregularities that may occur in the structure, particularly as a result of object impacts.

SUMMARY

According to the disclosed embodiments, a sandwich structure comprises a lightweight, segmented core which may reduce or arrest the propagation of irregularities that may occur in the structure, such as those resulting from an object impact on facesheets during service. The structure includes an arrestment feature that may be easily and inexpensively integrated into the core along joints where the core segments are spliced together. In addition to arresting the propagation of inconsistencies, the arrestment feature may improve the strength of the core, as well as both its fracture and structural toughness and the overall load carrying ability of the sandwich structure.

According to one disclosed embodiment, a composite sandwich structure is provided comprising a core including a plurality of core segments sandwiched between the facesheets. Arrestment means are provided between the core and each of the facesheets for arresting the propagation of an inconsistency in the facesheets. The arrestment means may include a composite wrap that covers edges of the core segments includes a portion sandwiched between the core and each of the facesheets. The arrestment means may further include a composite strap overlying joints between the core segments, as well as a layer of adhesive that joins the wraps along the joints.

According to another disclosed embodiment, a composite sandwich structure having integral arrestment comprises a segmented core sandwiched between and joined to first and second multi-ply, composite facesheets. The core includes a plurality of core segments that are spliced together along joints between their mutual edges. The sandwich structure further comprises composite wraps and composite straps. The wraps cover the edges of each of the core segments along the joints and may have a C-shaped cross section. The wraps on the adjacent core sections form a back-to-back C-shape along each of the joints. The composite straps respectively cover the joints and are sandwiched between each of the wraps and one of the facesheets. Each of the wraps may cover three adjacent sides of one of the core segments. Adjacent ones of the wraps may be joined together with a layer of adhesive. The wraps and the straps may comprise a fiber reinforced resin.

According to another embodiment, a method is provided of making a composite sandwich structure. The method comprises producing a core by forming joints between a plurality of core segments, and sandwiching the core between first and second facesheets, including joining the core to each of the facesheets. The method further comprises forming an arrestment feature between the core and at least one of the facesheets along each of the joints. Forming the arrestment feature may include placing a composite wrap on each of the core segments along each of the joints. Forming the arrestment feature may further include placing a composite strap between the wrap and at least one of the facesheets.

The disclosed embodiments satisfy the need for a composite sandwich structure and a method of producing the same that may overcome the limitations of existing sandwich structures while providing a segmented core that may exhibit improved strength, and which includes an integral arrestment feature that may limit the propagation of irregularities in the facesheets.

BRIEF DESCRIPTION OF THE ILLUSTRATIONS

DETAILED DESCRIPTION

Figure 1:
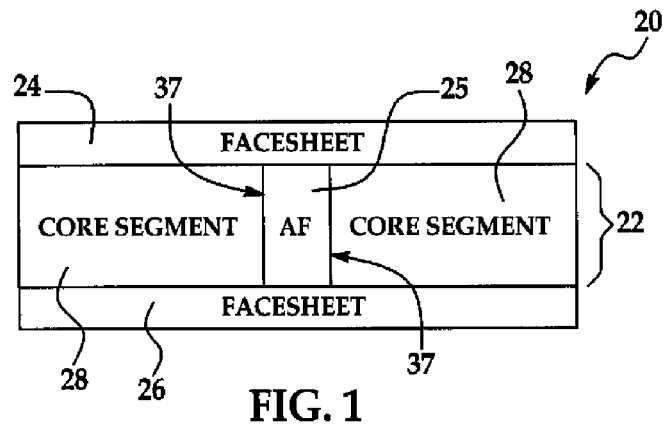
FIG. 1 is an illustration of a functional block diagram of a composite sandwich structure having an integral arrestment feature.
Figure 2:
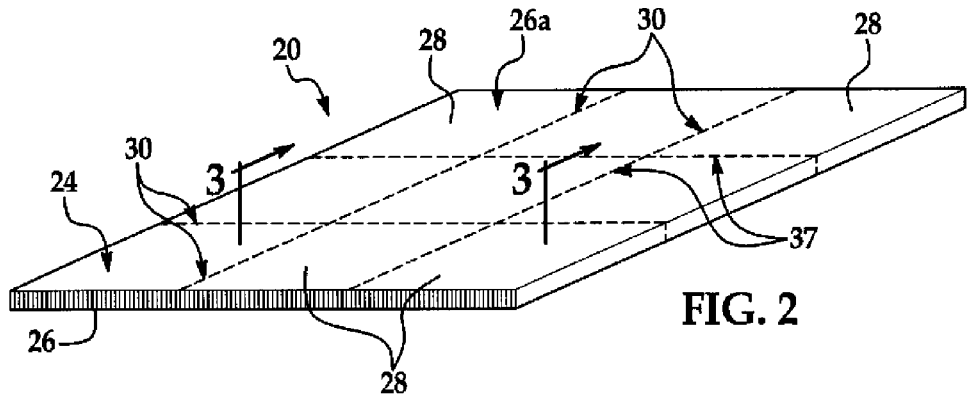
FIG. 2 is an illustration of a perspective view of a sandwich structure having a segmented core and an integral arrestment feature.

Referring first to FIGS. 1 and 2, the disclosed embodiments relate to a composite sandwich structure 20 comprising a segmented core 22 sandwiched between and affixed to first and second facesheets 24, 26. The core 22 includes a plurality of core segments 28 spliced together along their mutual edges 37 to form joints 30. In the illustrated embodiment, the joints 30 extend substantially orthogonal, however other geometries are possible. Also, while the sandwich structure 20 is shown as being substantially planar, it may include curves or contours (not shown) to suit the particular application.

The sandwich structure 20 includes an arrestment feature 25 along the joints 30, which is disposed between both adjacent ones of the core segments 28, and between the facesheets 24, 26. As will be discussed below in more detail, the arrestment feature 25 may function to arrest the propagation of one or more localized inconsistencies (not shown) in the sandwich structure 20, such as a disbond or crack in either of the facesheets 24, 26 resulting from, for example and without limitation, an object (not shown) impacting an outer surface 26a of one of the facesheets 26. As used herein "inconsistent area", "inconsistency" and "inconsistencies" refer to a localized area in the composite sandwich 20 that may be outside of designed tolerances. The inconsistency may comprise, for example and without limitation, a void, a dent, a crack or a porosity that may occur at the time the composite sandwich structure 20 is manufactured or later during the service life of the sandwich structure 20. Additionally, the arrestment feature 25 may provide the core 22 with additional strength and/or form alternate load paths through the sandwich structure 20.

Figure 3:
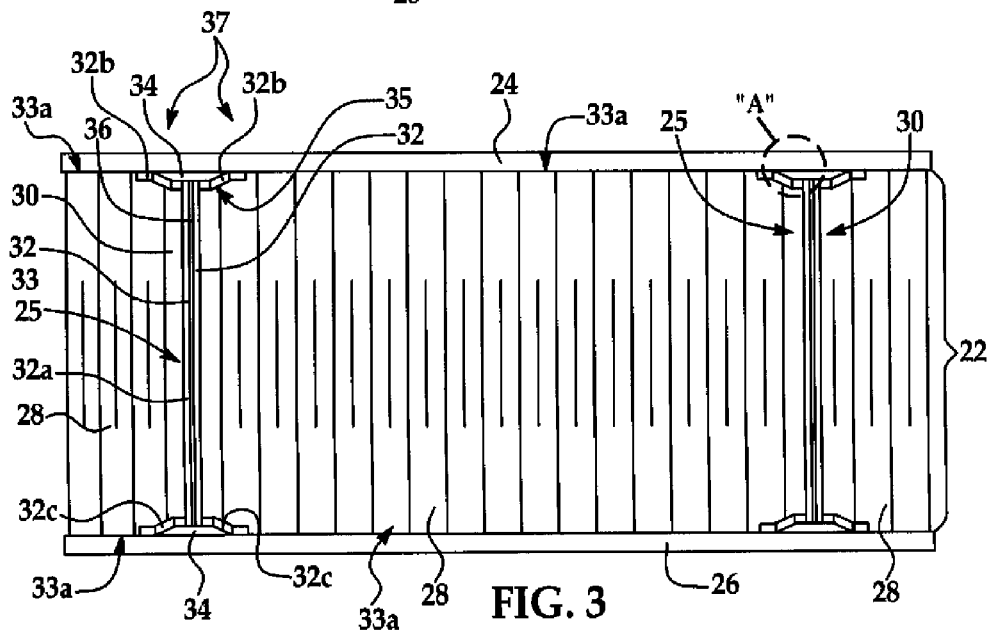
FIG. 3 is an illustration of a sectional view taken along the line 3-3 in FIG. 2.
Figure 4:
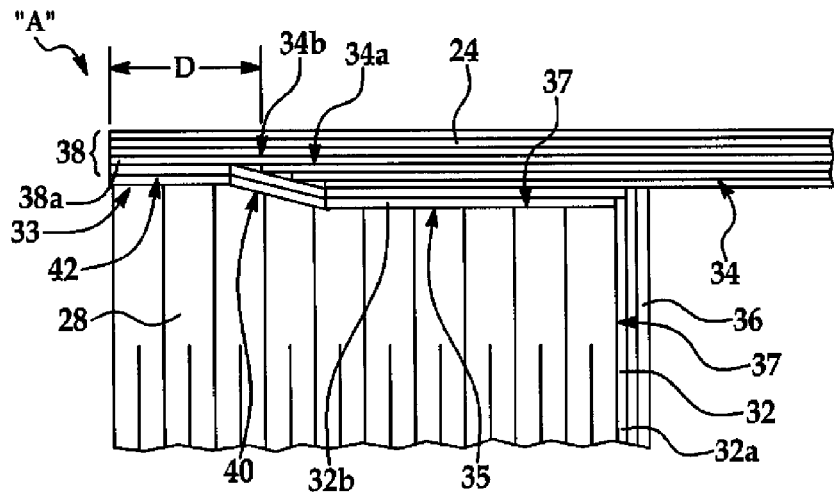
FIG. 4 is an illustration of the area designated as "A" in FIG. 3.

Referring now also to FIGS. 3 and 4, the arrestment feature 25 may comprise a pair of composite wraps 32, a pair of composite tear straps 34, and a layer 36 of adhesive between adjacent ones of the wraps 32. Each of the wraps 32 is generally C-shaped in cross section, and includes three legs 32a, 32b and 32c respectively covering three sides 33 of each of the core sections 28, along the outer edges 37 of the core section 28. Depending on the application, the wraps 32 may have cross sectional shapes other than a C-shape. The C-shaped wraps 32 are arranged in back-to-back relationship and are joined together by the adhesive layer 36 which extends substantially through the entire thickness of the core 22. In the illustrated embodiment, each of the core segments 28 includes a recess 35 in the outer faces 33a thereof. Legs 32b, 32c of each of the wraps 32 are received within the recesses 35 so that the facesheets 24, 26 lie substantially flat over the outer faces 33a of the core segments 28.

As best seen in FIG. 4, each of the legs 32b, 32c includes an outwardly tapered or inclined section 40, and an outer end 42 that extends substantially parallel to and engages a corresponding facesheet 24, 26. The outer ends of the legs 32b, 32c are sandwiched between the core section 28 and one of facesheets 24, 26, each of which may comprise multiple laminated composite plies 38.

The composite tear straps 34 extend along the joint 30 and are sandwiched between one of the facesheets 24, 26 and legs 32b, 32c of the wraps 32. As best seen in FIG. 4, each of the straps 34 lies within one of the recesses 35 to allow the facesheets 24, 26 to lie substantially flat. As will be discussed below, in other embodiments, the core segments 28 may not be provided with recesses 35, in which case the facesheets 24, 26 may include slightly raised areas (not shown) where the facesheets 24, 26 cover the wraps 32 and straps 34. The tear straps 34 may function to arrest the propagation of irregularities such as cracks in the structure 20 in the through-the-thickness direction of the structure 20.

Wraps 32 and tear straps 34 may each comprise a composite ply laminate such as, without limitation, a fiberglass reinforced epoxy resin which may be in the form of a unidirectional tape. The straps 34 may include ply drop offs 34a which conform to the tapered section 40 of the wrap 32. The outer end 42 of each of the wraps 32 extends a distance "D" beyond the outer edges 34b of each of the straps 34, so that the ends 42 of each of the wraps 32 are joined directly to the innermost ply 38a of one of the facesheets 24, 26. The extension of the wrap ends 32 past the tear straps 34 may aid in guiding the propagation of possible disbonds along a desired path that leads to arrestment.

From the forgoing, it can be appreciated that both the wraps 32 and the straps 34 are affixed directly to the facesheets 24, and that the core segments 28 are secured to the facesheets 24 through both the wraps 32 and the straps 34. Moreover, as best seen in FIG. 3, adjacent ones of the core sections 28 are spliced together by both the adhesive layer 36 which joins adjacent ones of the wraps 32, and by the straps 34 which extend between and are joined to adjacent ones of the wraps 32.

Reference is now made to FIG. 5 and FIGS. 6A-6F which illustrate the steps of making a composite sandwich structure such as that shown in FIGS. 1-4. Beginning at step 44 (FIG. 5) the desired number of core segments 28 are provided which may each comprise, as previously described, any of various materials and constructions, including, but not limited to honeycombs, foams and balsa as well as a combination of these and other materials. At step 46, the peripheral edges 37 (FIGS. 3 and 4) of each of the core segments 28 may be machined, as desired to form the recesses 35 in the core segments 28.

Figure 5:
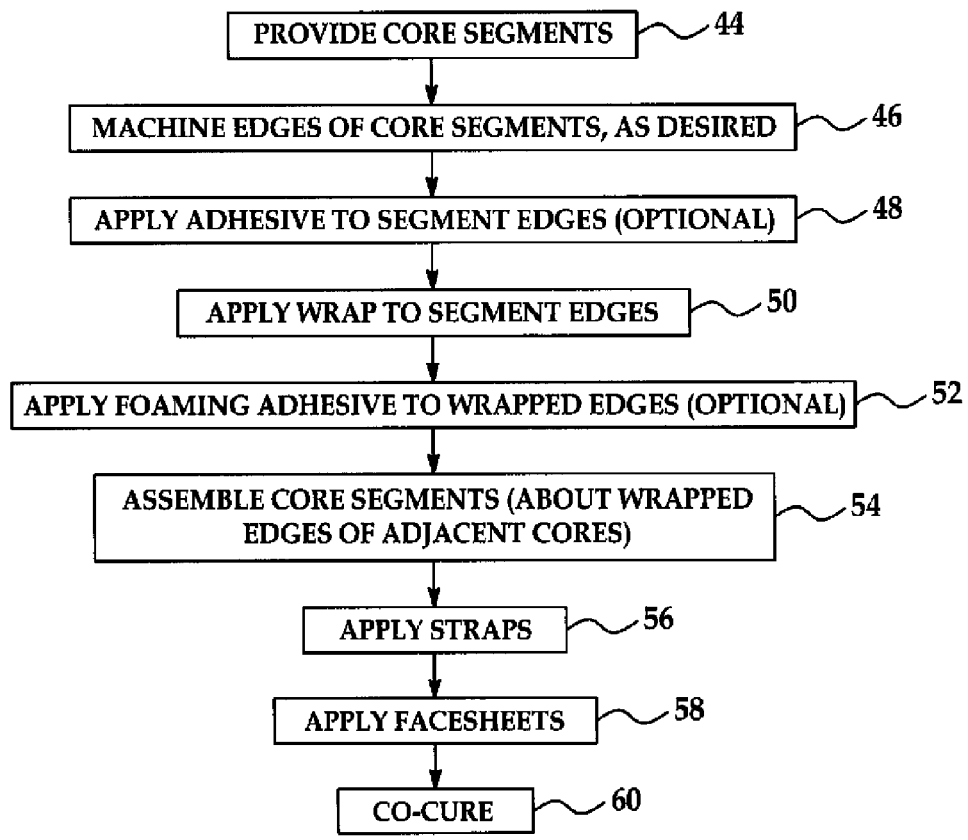
FIG. 5 is an illustration of a flow diagram showing the steps of a method of producing a sandwich structure having an integral arrestment feature.
Figure 6A:
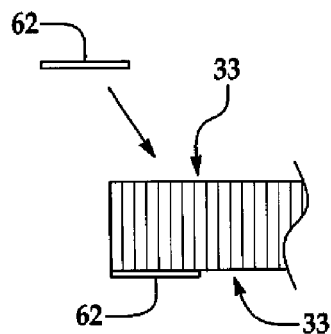
FIGS. 6A-6F are illustrations useful in explaining a method of producing the sandwich structure illustrated in FIGS. 1-4.
Figure 6B:
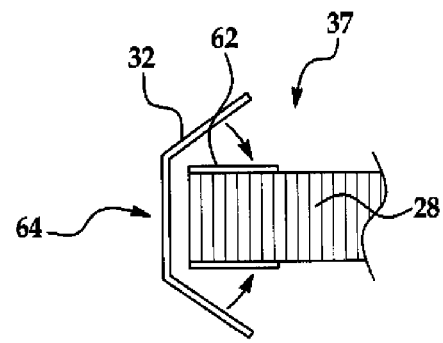
Figure 6C:
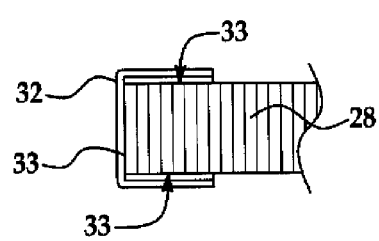

Next, as shown at step 48 in FIG. 5 and in FIG. 6A, a layer 62 of adhesive may optionally be applied to the outer sides 33 of each of the core segments 28 in order to aid in holding the wraps 32 in place during subsequent processing steps. At step 50 (FIG. 5) a strip 64 (FIG. 6A) of composite material is folded over the outer edges 37 of each of the core segments 28, so as to cover three sides 33 of the core segment 28, as shown in FIG. 6C. As previously noted, the layers 62 of adhesive may assist in holding the wrap 32 in its folded state covering all three sides 33 during subsequent processing steps.

Next, as shown at step 52 in FIG. 5, a layer of suitable adhesive 36 is applied to the wrapped edges 37 of the core segments 28, and particularly to the legs 32a of each wrap 32.

Figure 6D:
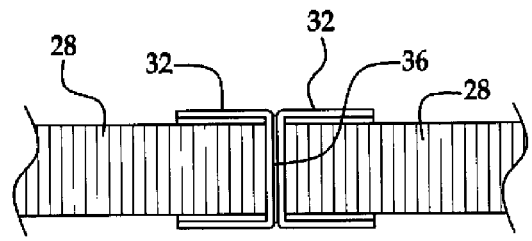
Figure 6E:
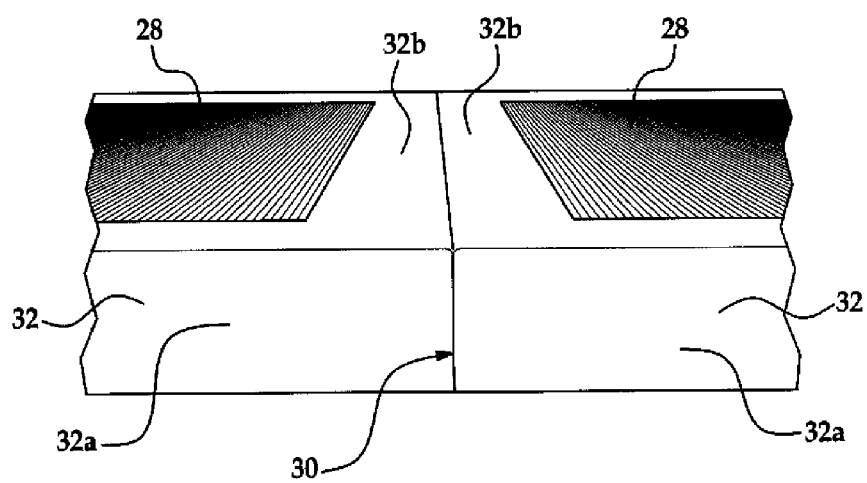

At step 54, core segments 28 are assembled to form the configuration shown in FIG. 2 by bringing the edges 37 of the core segments 38 into abutment with each other. FIGS. 6D and 6E illustrate the wrapped core segments 28 after completion of step 52. It should be noted here, that because the wraps 32 and the straps 34 are integrated into the core 22 in an uncured state, the assembled structure 20 may be formed before curing into curved or contoured parts if desired.

Figure 6F:
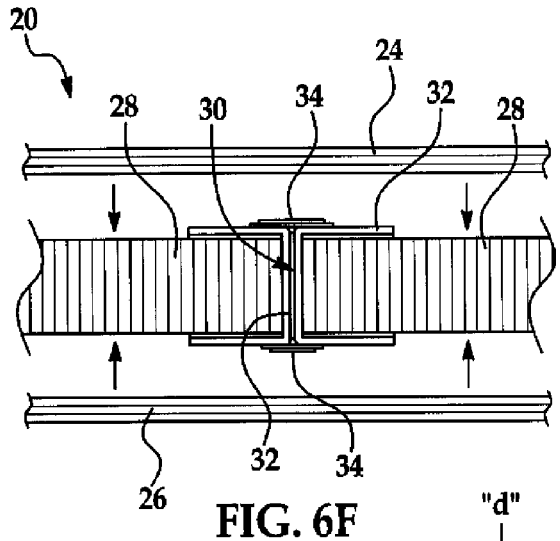

Next, as shown at step 56 in FIG. 5, the straps 34 are placed over adjoining wraps 32, overlying the joints 30, as shown in FIG. 6F. At step 58 in FIG. 5, the facesheets 24, 26 may be applied over the assembled core segments 28, also shown in FIG. 6F. Finally, at step 60 in FIG. 5, the constituent parts of the assembled sandwich structure 20 may be co-cured to form an integrated structure. The production process described above, and particularly the assembly process, may be carried out by hand labor or may be partly or fully automated by machines (not shown).

Figure 7:
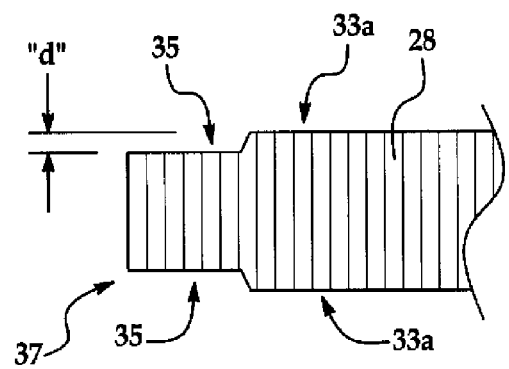
FIG. 7 is an illustration of a sectional view of an edge of one of the core segments in which recesses have been formed.

In the embodiment illustrated in FIGS. 6A-6F a recess 35 has not been formed in the core segments 28. Thus, in this embodiment, the facesheets 24, 26 may be slightly raised in the area of the joints 30. As previously mentioned, however, and as shown in FIG. 7, it may be possible to form recesses 35 in the core segments 28 to accommodate the combined thickness of the wraps 32 and the straps 34 by machining the outer faces 33a of the core segments 28 along the outer edges 37 to a depth "d", where "d" is substantially equal to the combined thickness of the straps 34 and the legs 32b of the wraps 32 (see FIG. 4).

Figure 8:
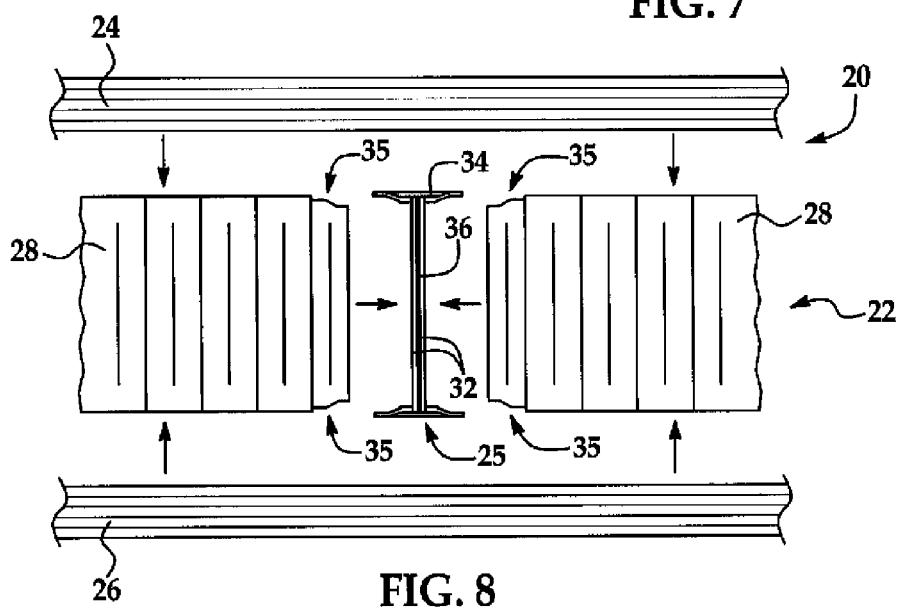
FIG. 8 is an illustration of an exploded sectional view showing an alternate method of producing the sandwich structure.

FIG. 8 illustrates a sandwich structure 20 similar to that described above, but which may be made by an alternate embodiment of the disclosed method. In this embodiment, the arrestment feature 25 comprises a pair of wraps 32, a pair of straps 34 and a layer of adhesive 36, that are preassembled prior to assembly of the core segments 28 and the facesheets 24, 26. In this embodiment, the arrestment feature 25, which is similar in cross sectional shape to the arrestment feature 25 previously described, may be pre-assembled as an uncured layup, using prepreg. The pre-assembled feature 25 may then be installed between the core segments 28 as the core segments are being assembled into the core 22. Following assembly of the core 22, the facesheets 24, 26 may be applied to the core 22, and the assembled structure 20 may then be cured. In other embodiments, depending upon the application, arrestment feature 25 may be pre-cured, in which case it may be joined to the core segments 28 and facesheets 24, 26 with a bonding adhesive that is cured along with the core segments 28 and facesheets 24, 26.

Figure 9:
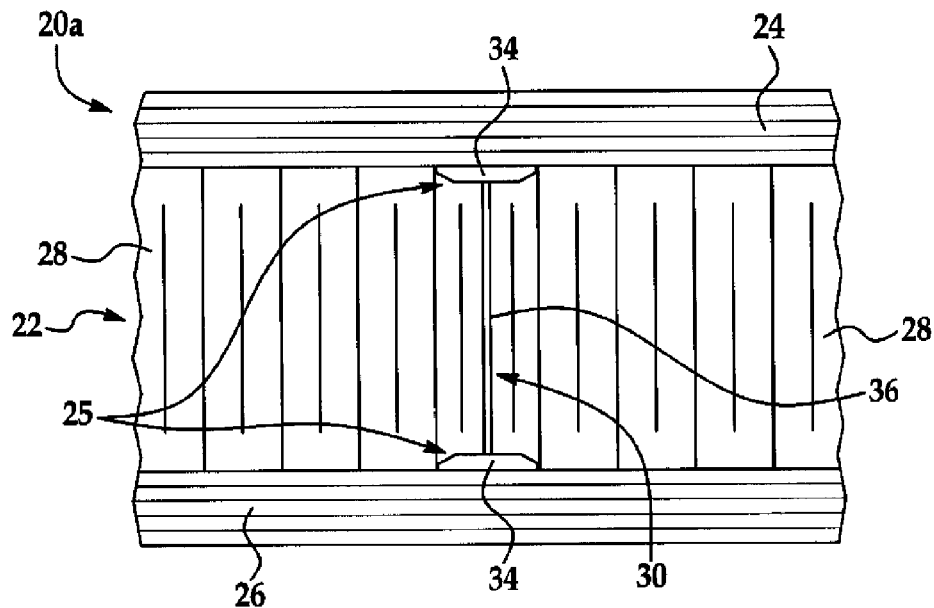
FIG. 9 is an illustration of a sectional view of a portion of a sandwich structure showing an alternate form of the arrestment feature.

In some embodiments, it may be not be necessary to use both the wraps 32 and the straps 34. For example, as shown in FIG. 9, in an alternate embodiment of the sandwich structure 20a, it may be possible to achieve adequate arrestment through the use of tear straps 34 which are sandwiched between the core segments 28 and the facesheets 24, 26, overlying the joints 30. In this example, the straps 34 are recessed into the core segments 28, and the layer of adhesive 36 joins adjoining core segments 28 along the joint 30.

Figure 10:
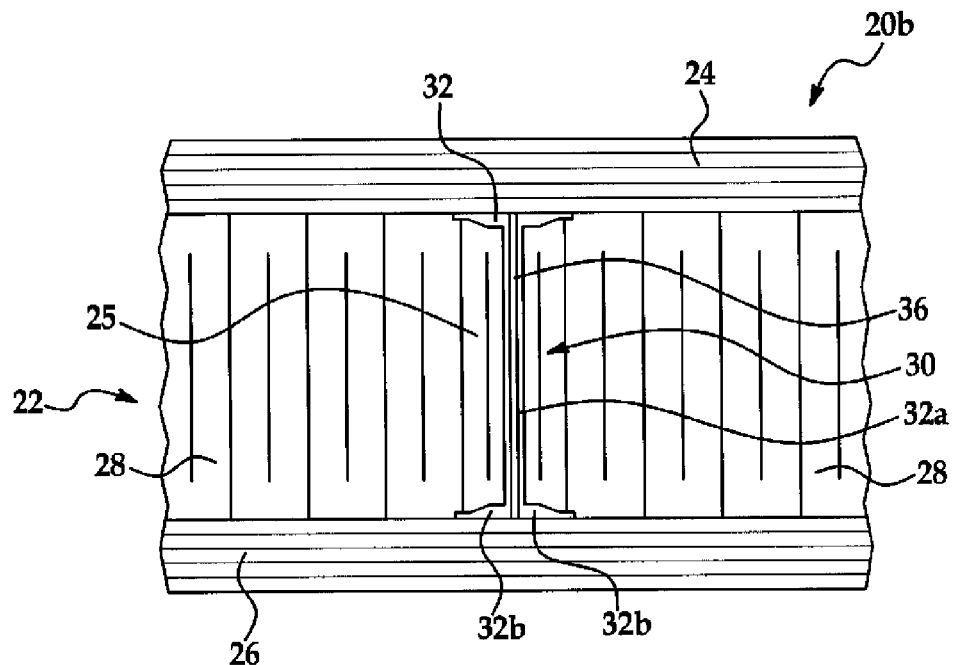
FIG. 10 is an illustration similar to FIG. 9 but showing another embodiment of the arrestment feature.

FIG. 10 illustrates another embodiment of a sandwich structure 20b in which the desired arrestment may be achieved through the use of wraps 32 joined together by the layer 36 of adhesive. In this example, adjacent core segments 28 are joined together through the wraps 32 and adhesive 36, while the entire lengths of the outer legs 32b, 32c of the wraps 32 are joined to the facesheets 24, 26. The back-to-back wraps 32 form an integral part of the core 22 which both reinforces the joints 30 and forms a periodic reinforcement between the core 22 and the facesheets 24, 26 that may aid in reducing propagation of inconsistencies such as disbonds in the facesheets 24, 26.

Figure 11:
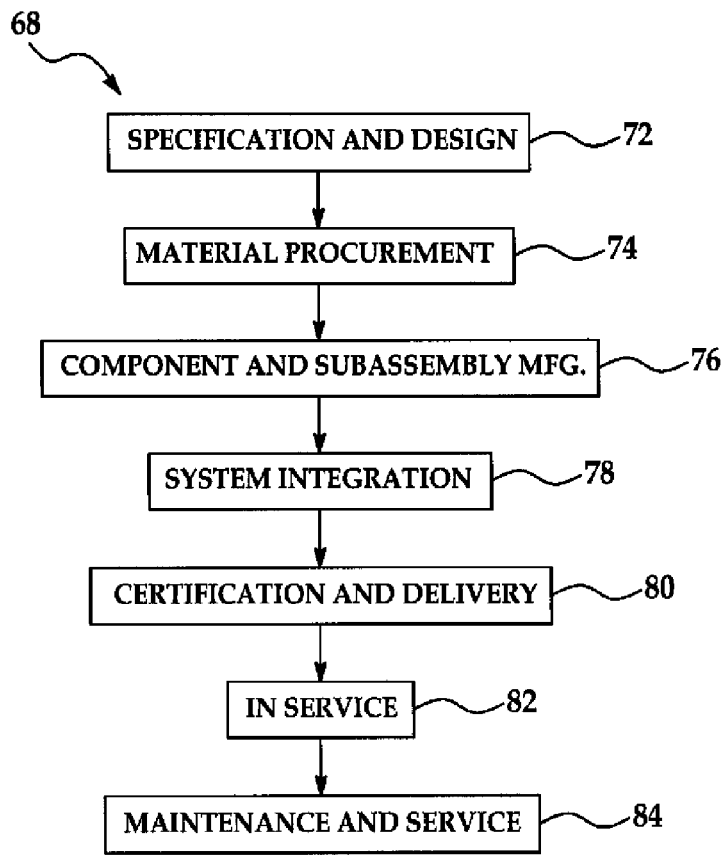
FIG. 11 is an illustration of a flow diagram of aircraft production and service methodology.
Figure 12:
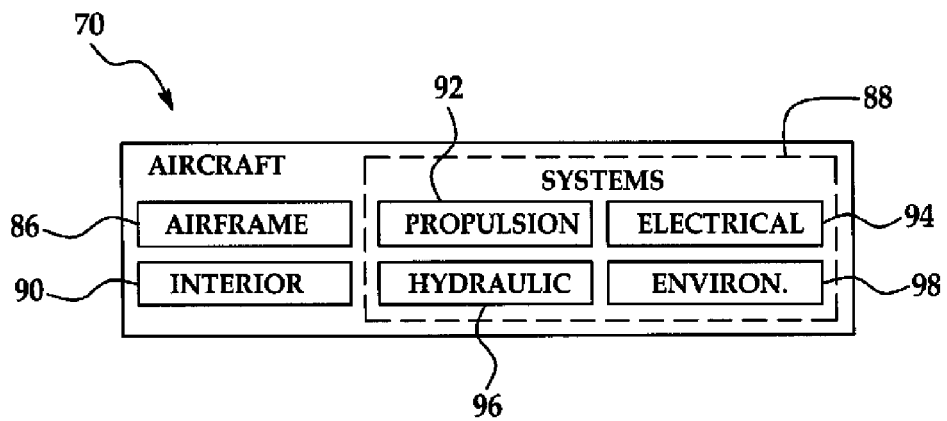
FIG. 12 is an illustration of a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 68 as shown in FIG. 11 and an aircraft 70 as shown in FIG. 12. During pre-production, exemplary method 68 may include specification and design 72 of the aircraft 70 and material procurement 74, during which the disclosed sandwich structure 20 may be specified for use in the aircraft 70. During production, component and subassembly manufacturing 76 and system integration 78 of the aircraft 70 takes place. The disclosed method may be used during processes 76, 78 to manufacture and assemble components that incorporate the disclosed sandwich structure 20. Thereafter, the aircraft 70 may go through certification and delivery 80 in order to be placed in service 82. While in service by a customer, the aircraft 70 is scheduled for routine maintenance and service 84 (which may also include modification, reconfiguration, refurbishment, and so on). The disclosed method may be used to produce sandwich structures that are installed on the aircraft as part of the maintenance and service 84.

Each of the processes of method 68 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 70 produced by exemplary method 68 may include an airframe 86 with a plurality of systems 94 and an interior 90. Examples of high-level systems 94 include one or more of a propulsion system 92, an electrical system 94, a hydraulic system 96, and an environmental system 98. Any number of other systems may be included. Although an aerospace example is shown, the principles of the disclosure may be applied to other industries, such as the marine, automotive and construction industries.

Systems and methods embodied herein may be employed during any one or more of the stages of the production and service method 68. For example, components or subassemblies using the disclosed sandwich structure corresponding to production process 76 may be fabricated or manufactured in a manner similar to components or subassemblies produced while the aircraft 70 is in service. Also, one or more of the disclosed embodiments may be utilized during the production stages 76 and 78, for example, by substantially expediting assembly of or reducing the cost of an aircraft 70. Similarly, one or more of the embodiments, or a combination thereof may be utilized while the aircraft 70 is in service, for example and without limitation, to maintenance and service 184.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An aircraft structure comprising:
   a first facesheet and a second facesheet, each comprising a composite laminate;

a core comprising a first core segment and a second core segment, the core being joined to and sandwiched between the first facesheet and the second facesheet, a joint being between the first core segment and the second core segment, the joint being sandwiched between the first facesheet and the second facesheet; and an arrestment feature configured to arrest propagation of an inconsistency, the arrestment feature wrapping at least partially around two sides of at least one of the first core segment and the second core segment at about the joint, and the first face sheet and the second facesheet each extending over the arrestment feature, wherein the arrestment feature wraps around two sides of the first core segment and two sides of the second core segment such that the first facesheet and the second facesheet are both in contact with portions of the arrestment feature, wherein the arrestment feature comprises a first wrap and a second wrap, wherein the first wrap and the second wrap both are generally C-shaped in cross section, wherein the first wrap covers three sides of the first core segment, and wherein the second wrap covers three sides of the second core segment;

wherein at least one of a first composite strap overlies the joint, wherein the first composite strap is sandwiched between the first facesheet and both the first wrap and the second wrap and wherein at least one of a second composite strap overlies the joint, wherein the second composite strap is sandwiched between the second facesheet and both the first wrap and the second wrap; and wherein at least the first composite strap is placed in a first recess in contiguous first outer faces of the first core segment and the second core segment facing the first facesheet and the second composite strap is placed in a second recess in contiguous second outer faces of the first core segment and the second core segment facing the second facesheet.

2. The structure of claim 1, wherein:

the first core segment and the second core segment are further joined by at least one composite strap.

3. The structure of claim 2, wherein the arrestment feature includes a layer of adhesive joining the first wrap and the second wrap at the joint.

4. A vehicular structure comprising:

a first facesheet and a second facesheet, each comprising multiple plies of a composite material;

a segmented core sandwiched between and joined to the first facesheet and second facesheet, the segmented core including a plurality of core segments spliced together along corresponding joints between mutual edges of the plurality of core segments; and a plurality of arrestment features, wherein ones of the plurality of arrestment features extend along ones of the corresponding joints, wherein all of the plurality of arrestment features are sandwiched between the first facesheet and the second facesheet, and wherein all of the plurality of arrestment features are configured to arrest propagation of an inconsistency in the structure, wherein the plurality of arrestment features include:

corresponding composite wraps covering corresponding edges of the plurality of core segments along ones of the corresponding joints, the corresponding composite wraps forming corresponding back-to-back C-shape cross sections along ones of the corresponding joints, and corresponding composite straps respectively covering ones of the corresponding joints and correspondingly sandwiched between the corresponding composite wraps and one of the first facesheet and the second facesheet wherein the corresponding composite straps are placed at the corresponding joints into recesses in outer faces of the core segments.

5. The structure of claim 4, further comprising:

corresponding layers of adhesive adhesively joining the corresponding composite wraps on each side of each of the corresponding joints.

6. The structure of claim 4, wherein: each of the corresponding composite wraps and the corresponding composite straps comprise a fiber reinforced resin.

7. A vehicular structure, comprising:

a first facesheet and a second facesheet, each comprising multiple plies of a composite material;

a core including a plurality of core segments sandwiched between the first facesheet and the second facesheet; and corresponding joints connecting ones of the plurality of core segments together along edges of the plurality of core segments, the corresponding joints including arrestment features including corresponding pairs of composite wraps respectively wrapped around edges of adjacent core segments, and corresponding pairs of composite straps respectively engaging the first facesheet and the second facesheet, the corresponding pairs of composite wraps forming corresponding back-to-back C-shape cross sections along ones of the corresponding joints, and the arrestment features further including corresponding composite straps respectively covering ones of the corresponding joints and correspondingly sandwiched between the corresponding composite wraps and one of the first facesheet and the second facesheet wherein the corresponding composite straps are placed at the corresponding joints into recesses in outer faces of the core segments.

8. The structure of claim 7, wherein:

the corresponding pairs of composite wraps overlie at least corresponding portions of each of three sides of corresponding ones of the plurality of core segments.

9. The structure of claim 7, wherein portions of the corresponding pairs of composite wraps engage the first facesheet and the second facesheet.

10. The structure of claim 7, wherein the arrestment features are preassembled as an uncured layup.

* * * * *